United States Patent Office 3,314,764
Patented Apr. 18, 1967

3,314,764
PICRATE PROCESS FOR DETERMINING QUATERNARY AMMONIUM CONTENT OF MICROBIAL POLYSACCHARIDES
James H. Sloneker, Morton, Ill., assignor to the United States of America as represented by the Secretary of Agriculture
No Drawing. Filed July 9, 1964, Ser. No. 381,594
2 Claims. (Cl. 23—230)

ABSTRACT OF THE DISCLOSURE

Accurate spectrophotometric determinations of residual quaternary ammonium (QA) residues in QA-precipitated microbial polysaccharides are obtained when the precipitated polysaccharide is hydrolyzed with 3M monosodium phosphate and the pH of the acid hydrolysate is adjusted to a pH of about 4.3 with sodium hydroxide before adding picric acid to form the chloroform extractable QA-picrate salt, the absorbency of which at 365 m$\mu$ is then compared with that of a standard. Unlike buffered hydrolysates containing chloride ions, the above does not cause a misleading partial solubility of the QA-picrate in the aqueous phase.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to a picrate salt spectrophotometric process for assaying the residual quaternary ammonium cation (QN+) content of QN+-precipitated microbial polysaccharides, which polysaccharides per se are known and have diverse commercial utilities as thickening agents for foodstuffs, drilling muds, etc. and as film-forming agents. Representative prior art microbial polysaccharides that are effectively precipitated from their fermentation broths by quaternary ammonium compounds include the polysaccharides produced by the bacterium *Xanthomonas campestris* NRRL B–1459 and by the yeast *Cryptococcus laurentii* NRRL Y–1401.

The above mentioned microbial polysaccharides are described by Cadmus et al., Appl. Microbiol. 10: 153 (1962), Jeanes et al., J. Appl. Polymer Sci., 5: 519 (1961); Jeanes et al., Arch. Biochem. Biophys., 92: 343 (1961); and Rogovin et al., Ind. Eng. Chem., 53: 37 (1961).

Rogovin et al., U.S. Patent 3,119,812 describes a quaternary ammonium process for effectively precipitating highly dilute microbial polysaccharides from their fermentation broths, the quaternary ammonium cation of cetyltrimethylammonium chloride or other quaternary ammonium compound complexing with the anionic groups of the polysaccharide to form an insoluble salt from which most of the costly QN+ cation is subsequently recovered for re-use via an ion-exchange type reaction provided by washing the complex with absolute methanol containing 0.2 percent KCl.

Quaternary ammonium compounds frequently have been used in research either to purify polyanionic polysaccharides or to fractionate acidic polysaccharides from neutral polysaccharides, but strongly cationic quaternary ammonium compounds such as cetyltrimethylammonium chloride have no visible or UV absorption spectra, and cannot be measured directly spectrophotometric means. Consequently, Auerback, Ind. Eng. Chem., Anal. Ed., 16: 739 (1944); Fogh et al., Anal. Chem., 26: 392 (1954); and Metcalfe, ibid., 32: 70 (1960) complexed anionic dyes with the QN+ and spectrophotometrically measured the resulting complex. The extremely viscous nature of the native microbial polysaccharide solutions necessitates acid hydrolysis and neutralization, and since the dyes have several anionic functional groups, these form poorly reproducible complex equilibria with the QN+, particularly in the presence of the high concentrations of carbohydrate and salt present in the necessarily hydrolyzed and neutralized material. Attempts to separate the QN+ on cellulose ion-exchange columns as also suggested by Metcalfe, supra, were unsatisfactory.

The principal object of our invention is a rapid and highly reproducible spectrophotometric method for quantitating the QN+ content of QN+-precipitated microbial polysaccharides, such quantitations being necessary for preventing prohibitive losses of the costly quaternary compounds and for preventing the presence of objectionable levels of the QN+ ion where the polysaccharide is to be used in foods.

In accordance with the said object of this invention I have found that picric acid is an ideal reagent for assaying the QN+ ion of quaternary ammonium-precipitated microbial polysaccharides because it has a single, strongly anionic functional group and a strong UV absorption spectrum. The reaction between picric acid and the QN+ ion in aqueous solution is rapid, and precipitation of the resulting picrate salt is quantitative. The salt is conveniently separated from the excess picric acid by simple extraction with chloroform, and the absorbence of the chloroform extract is measured at 365 m$\mu$, at which wavelength the specific QN+-picrate has a molar absorptivity of $1.5 \times 10^4$.

I have also found that when the highly viscuos microbial polysaccharide solutions have been heated with hydrochloric or other acid to sufficiently lower the viscosity and then neutralized with NaOH the appreciable amount of thusly formed sodium chloride does not "salt out" the QN+-picrate but unfavorably shifts the equilibrium of the precipitation reaction to cause a partial solubility of the QN+-picrate in the aqueous phase, thus preventing a quantitative extraction of the QN+-picrate from the aqueous layer. Such partial solubility in the aqueous phase and incomplete extraction of the picrate into the chloroform layer makes the standard curves pass through the abscissae rather than through the origins, thereby seriously impairing the accuracy of the analysis. However, I have found that when the polysaccharide is hydrolyzed with phosphoric acid and then neutralized with NaOH, a resulting 0.8M concentration of monosodium phosphate does not interfere with the precipitation of the QN+-picrate, the distribution of QN+-picrate between chloroform and solutions of $NaH_2PO_4$ at pH 4.3 or $Na_2HPO_4$ at pH 7 barely and only immaterially differing from its distribution between chloroform and distilled water. Standard curves made with $NaH_2PO_4$ in the aqueous layer are linear and they pass through the origin. Also, the aqueous solution of monosodium phosphate provides excellent buffering action from pH 3 to pH 9 that must be employed to avoid either chloroform extraction of appreciable amounts of un-ionized picric acid below pH 3 which results in high assay blanks and greatly reduced accuracy and sensitivity or to avoid the known alkaline degradation of certain sensitive quaternary ammonium compounds that occurs above pH 9. For convenience we neutralized the polysaccharide hydrolysates to pH 4.3, but the above mentioned pH range is operative.

Even high concentrations (10–20% based on the polysaccharide) of amino acids and amino sugars do not interfere with the indicated determination of $QN^+$ in the hydrolyzed solutions of microbial polysaccharides, and the assay method is also applicable to both acidic polysaccharides that contain amino sugars and to hydrolyzed crude samples containing proteinaceous impurities from the fermentation medium.

Since the high viscosities of aqueous solutions of the $QN^+$ precipitated native polysaccharides must be eliminated by acid hydrolysis before adding the picric acid, it is advisable to point out that the polysaccharide produced by *Xanthomonas campestris* NRRL B–1459 is extraordinarily resistant to hydrolysis by 1 molar phosphoric acid under normal hydrolysis conditions, 6 to 8 hours being required at 100° C. However, the required hydrolysis with 1.2M phosphoric acid was obtained in only 20 minutes by autoclaving the solutions at 120° C. and 15 p.s.i. pressure.

My picrate analytical procedure was also found to be fully operative with cetylpyridinium chloride (fourfold increase in sensitivity over direct spectrophotometric method), trimethylarachidyl-behenylammonium chloride, dodecyltrimethylammonium chloride and cetyldimethylbenzylammonium chloride (about 20 times greater sensitivity) as well as for the quantitative assay of certain secondary amines, namely dicyclohexylamine, and D,L-coniine, i.e., 2-propylpiperidine.

The following examples illustrate the employment of my invention on aliquots of the $QN^+$ precipitated polysaccharide from *X. campestris* NRRL B–1459 that has been first washed with 0.2 percent KCl in absolute methanol to remove most of the $QN^+$ ions and on another aliquot of the same polysaccharide that has not been washed with the described methanolic solution and, therefore, has a very much greater $QN^+$ content.

*Example 1*

Polysaccharide B–1459 produced in an aerobic fermentation of *Xanthomonas campestris* NRRL B–1459 in a medium containing carbon and nitrogen sources and trace metals was precipitated from its medium of origin in the form of the cetyltrimethylammonium complex as taught by Rogovin et al., U.S. 3,119,812. The untreated complex having a $QN^+$ content of 13.6 percent was divided into two portions, one of which was directly used as in the present example, the other portion being washed with successive portions of methanolic KCl solution to remove essentially all of the $QN^+$ cations to provide the material of Example 2.

Thirty-five mg. (dry basis) of untreated complex was dissolved in 50 ml. of water, 1 ml. aliquots of the resulting slightly viscous solution then being transferred to replicate 12-ml. conical centrifuge tubes and diluted by the addition of 0.5 ml. of water to each. After adding 1 ml. of 3M $H_3PO_4$ to each tube, the acidified solutions were autoclaved for 20 minutes at 120° C. and the pH of the hydrolysates then adjusted to 4.3 by the addition of 1 ml. of 3M NaOH. Then 0.1 ml. of a half saturated solution of picric acid was added to each hydrolysate to precipitate the $QN^+$ cation as its picrate salt. The said salt was selectively extracted by intimately mixing with three 1.5 ml. volumes of chloroform. The chloroform layers were combined in a 10 ml. volumetric flask, made up to volume, and transferred to the colorimeter tube of a Beckman Model B spectrophotometer, the absorbence values at 365 mµ being compared with the values corresponding to a $QN^+$ value of 13.6±0.27 percent from a standard curve based on reagent grade cetyltrimethylammonium bromide.

Standard curves in the absence of polysaccharide were prepared by pipetting 0.1 ml. to 1 ml. of a 0.01 percent solution of the quaternary ammonium compound, equivalent to 10 to 100 µg. $QN^+$ cation, adding distilled water to make the volume 1.5 ml., adding 1.0 ml. of 3M $H_3PO_4$ solution, neutralizing to pH 4.3 with 1 ml. 3M NaOH, adding 0.1 ml. of half-saturated picric acid solution, extracting the $QN^+$ picrate precipitate with three 1.5 ml. portions of chloroform, and bringing the pooled extracts up to a volume of 10 ml.

Standard curves in the presence of polysaccharide were obtained by weighing varied amounts of microbial polysaccharide (ranging up to 80 mg.) into 12 ml. centrifuge tubes, allowing the polysaccharide to dissolve overnight in 1.5 ml. of distilled water containing appropriate amounts of $QN^+$ cation, hydrolyzing the extremely viscous polysaccharide solution as previously described, neutralizing, and extracting with chloroform. Identical sets of standard curves were obtained with each respective quaternary ammonium system in either the presence or absence of microbial polysaccharide or by serial dilution of a known quantity of crystalline QN-picrate in dry chloroform. At pH 4.3 negligible quantities of picric acid are extracted from the aqueous layer, and the chloroform blanks have desirably low absorbence values.

*Example 2*

Seventy mg. portions (dry basis) of polysaccharide B–1459, identical to that used in Example 1 excepting that most of its cetyltrimethylammonium content had been removed by treatment with the mentioned methanolic KCl solution, were weighed into replicate 12 ml. conical centrifuge tubes and each then dissolved in 1.5 ml. of water. Following acidification with 1 ml. of 3M $H_3PO_4$ the tubes were autoclaved at 120° C. for 20 minutes and allowed to cool before neutralizing with 1 ml. of 3M NaOH. Then 0.1 ml of a half saturated solution of picric acid was added and the QN picrate selectively extracted with portions of chloroform as in Example 1. Comparison of the obtained spectrophotometer readings with a previously prepared standard curve showed the residual $QN^+$ content of the polysaccharide to be 0.085±0.005 percent.

The $QN^+$ content of process liquors after recovery of the microbial polysaccharides can be assayed precisely as for the polysaccharides excepting that since the hydrolysis step is unnecessary, the aliquots are directly buffered to pH 4.3 with 3M $NaH_2PO_4$ solution.

I claim:
1. A photometric process for determining the quaternary ammonium cation content of a microbial polysaccharide produced by a microorganism selected from the group consisting of *Xanthomonas campestris* NRRL B–1459 and *Cryptococcus laurentii* NRRL Y–1401 after said polysaccharide has been precipitated from its medium of origin by being complexed with the cation of a quaternary ammonium compound selected from the group consisting of cetyltrimethylammonium chloride, trimethylarachidyl behenylammonium chloride, dodecyltrimethylammonium chloride, and cetyldimethylbenzylammonium chloride, said process comprising the steps of dissolving not more than about 80 mg. (dry basis) of the quaternary ammonium-containing microbial polysaccharide in 1.5 ml. of water, acidifying with 1 ml. of 3M monosodium phosphate solution, autoclaving the mixture for about 20 minutes at 120° C. to hydrolyze the polysaccharide and lower the viscosity of the solution, adding 1 ml. of 3M sodium hydroxide to provide a buffered pH of 4.3, adding 0.1 ml. of half-saturated picric acid solution to form the quaternary ammonium picrate salt, selectively extracting said picrate salt with three 1.5 ml. portions of chloroform, adding chloroform to bring the pooled chloroform extracts up to a predetermined volume, reading the absorbence of the resulting solution in a spectrophotometer set at a wavelength of 365 mµ, and comparing the obtained reading with that of a standard curve.

2. The process of claim 1 wherein the microbial polysaccharide is that produced by *Xanthomonas campestris* NRRL B-1459 and wherein the therewith complexed quaternary ammonium cation is that of cetyltrimethylammonium chloride.

References Cited by the Examiner

UNITED STATES PATENTS 3,119,812  1/1964  Rogovin et al. _____ 260—209

OTHER REFERENCES

Pifer et al.: Analy. Chem., 24, 300–306 (1952).
Hall: Chem. Abs., 47, 4249 (1953).
Dunicz: Chem. Abs., 61, 953 (July 1964).
Metcalfe: Analy. Chem., 32, 70 (1960).

MORRIS O. WOLK, *Primary Examiner.*
L. MEI, *Assistant Examiner.*